United States Patent Office 3,478,182
Patented Nov. 11, 1969

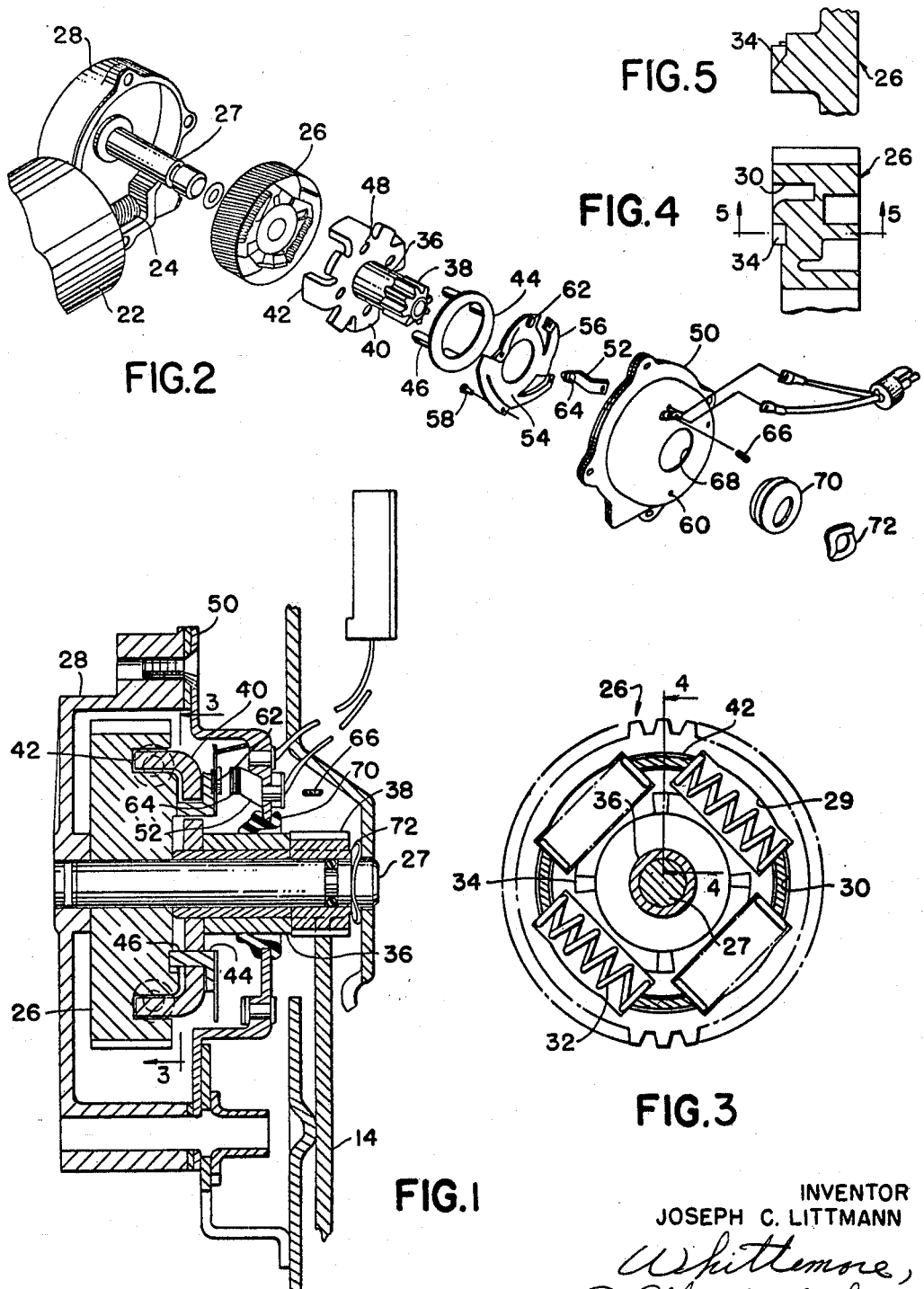

3,478,182
ROTARY DRIVE MECHANISM INCLUDING TORQUE RESPONSIVE SWITCH
Joseph C. Littmann, Grosse Pointe Woods, Mich., assignor to Ferro Manufacturing Corporation, Detroit, Mich., a corporation of Michigan
Original application May 1, 1967, Ser. No. 634,949. Divided and this application Aug. 28, 1967, Ser. No. 663,717
Int. Cl. H01h 35/00, 35/02, 35/06
U.S. Cl. 200—61.46                                    7 Claims

ABSTRACT OF THE DISCLOSURE

A torque responsive switch including rotary elements designed for relative movement about the axis of rotation, cam means acting between said elements to effect relative axial movement therebetween upon relative angular movement, and switch contacts adapted to be controlled by relative axial movement between said elements.

CROSS-REFERENCE TO RELATED APPLICATION

This is a division of application Ser. No. 634,949 filed May 1, 1967, which in turn is a continuation-in-part of application Ser. No. 476,302, filed Aug. 2, 1965, now Patent No. 3,348,638.

BACKGROUND OF THE INVENTION

The present invention solves the problem of transmitting torque through a system including members adapted to be rotated at substantial speeds, which is nevertheless responsive to the transmitted torque for controlling an electric switch.

SUMMARY OF THE INVENTION

In accordance with the present invention the mechanism comprises a pair of elements adapted to be rotated simultaneously about a common axis of rotation, said elements being relatively angularly movable about the said axis of rotation, torque transmitting resilient means acting between said elements, said elements being in addition relatively axially movable and including camming means operable upon relative angular movement to produce relative axial movement therebetween, together with switch means responsive to relative axial movement between said members.

It is therefore an object of the present invention to provide a torque transmitting rotary drive including means operable independently of the speed of rotation of the drive but responsive solely to the torque transmitted to control an electric switch in accordance with transmitted torque.

Other abjects and features of the invention will become apparent as the description proceeds, especially when taken in conjunction with the accompanying drawing, illustrating a preferred embodiment of the invention.

BRIEF DESCRIPTION OF THE DRAWING

FIGURE 1 is a sectional view through the mechanism embodying the present invention.

FIGURE 2 is an exploded view of the components shown assembled in FIGURE 1.

FIGURE 3 is a sectional view on the line 3—3, FIGURE 1.

FIGURE 4 is a sectional view on the line 4—4, FIGURE 3.

FIGURE 5 is a sectional view on the line 5—5, FIGURE 4.

DESCRIPTION OF THE PREFERRED EMBODIMENT

The mechanism comprises an electric motor 22 having an output shaft carrying a worm 24 which meshes with and drives a worm gear 26 mounted on a post 27 carried by a housing 28. The gear 26 is formed with four equally spaced pockets 29 interconnected by arcuate laterally opening passages 30. Received within each of the pockets 29 is an elongated coil compression spring 32. Also provided on the side of the gear 26 which contains the pockets 29 are a plurality of circumferentially inclined ramp surfaces 34 for a purpose which will presently appear.

A sub-assembly comprising a sleeve 36, a drive pinion 38, and a spider 40 is mounted for rotation on the post 27. The spider 40 has a plurality of legs 42 each of which extends into one of the passages 30, each of the legs engaging corresponding ends of one of the coil compression springs 32. As best seen in FIGURE 3, the opposite ends of the compression springs 32 seat against the ends of the pockets 29 and in normal position the opposite ends of the springs engage the opposite ends of the pockets.

As the gear 26 is driven in rotation by the worm 24 torque is applied through the springs 32 to the spider and through the sleeve 36 to the pinion 38. If rotation of the pinion 38 is opposed, the springs 32 are compressed in accordance with the resistance opposing rotation of the pinion and relative rotation takes place between the worm gear 26 and the spider 40.

Rotatable on the post 27 is an annular plate 44 having a plurality of pins 46 extending through openings 48 provided in the spider 40. Accordingly, the plate 44 is driven in rotation by the spider 40 but is movable axially of the post 27 relative thereto.

The structure so far described is received within the housing 28 which is provided with a cover 50. Secured to the inside of the cover 50 is switch mechanism including an electrical spring contact arm 52 and a contact plate 54 having a plurality of spring arms 56, the free ends of which are secured to the cover 50 by screws 58 extending into openings 60 in the cover. Contact plate 54 includes a contact 62 which is engageable with a contact element 64 carried by the spring contact arm 52.

In use, as resistance is applied to rotation of the mechanism turned by the pinion 38, relative angular movement about the axis of rotation between the spider 40 and the worm gear 26 takes place between the spider 40 and the worm gear 26, and the pins 40 ride up the inclined ramp surfaces 34 pushing the annular plate 44 to the right as seen in FIGURES 1 and 2. The contact plate 54 may be in continuous engagement with the annular plate 44 or it may be spaced from it until the loading on the pinion 38 approaches the set value, at which time the contact plate 54 is moved to the right, this movement being permitted by yielding of the spring arms 56. At the preset loading, electrical contact takes place between the contacts 62 and 64, which may operate a relay or otherwise effect an electric circuit controlled thereby.

Means are provided for varying the loading at which contact occurs, and this means takes the form of an adjusting screw 66 which adjusts the position of contact element 64, this movement being permitted by flexing of spring contact arm 52.

The opening 68 through the cover 50 is of a size to permit passage of the pinion 38 and the opening is closed by a resilient annular seal 70. A spring washer 72 is provided which retains the pinion, sleeve and spider assembly in the operative position shown in FIGURE 1.

Referring again to FIGURE 1, the pinion 38 is shown in mesh with a gear or toothed sector 14 so that when the motor 22 drives the gear 26 in rotation the pinion 38 drives the gear or sector 14, this constituting the output of the drive transmission.

The drawing and the foregoing specification constitute a description of the improved rotary drive mechanism including torque responsive switch in such full, clear, concise and exact terms as to enable any person skilled in the art to practice the invention, the scope of which is indicated by the appended claims.

What I claim as my invention is:

1. A load responsive switch device comprising a rotary driver having a plurality of pockets located within said driver around its periphery, springs in said pockets, a driven rotary member having means engaging said springs to be driven thereby, camming means including a part carried by said driver and a part carried by said driven member in its rotation, said driven member comprising a spider having legs extending into said pockets, said springs being coil springs having correspondings ends thereof engaging said legs, and a switch actuated by relative movement between said cam parts upon predetermined relative rotation between said driver and driven member.

2. A load responsive switch device comprising a rotary driver having a plurality of pockets located within said driver around its periphery, springs in said pockets, a driven rotary member having means engaging said springs to be driven thereby, camming means including a part carried by said driver and a part carried by said driven member in its rotation, and a switch actuated by relative movement between said cam parts upon predetermined relative rotation between said driver and driven member, said cam part carried by said driven member comprising a plate having pins projecting through openings in said driven member and engaging inclined ramp surfaces on said driver constituting the cam part carried by said driver.

3. A device as defined in claim 2 in which said switch means includes contacts one of which is operatively connected to said plate for movement therewith relative to the other contact.

4. A rotary power transmission comprising a pair of power transmitting elements rotatable about a common axis of rotation and connected for limited relative angular movement about the common axis of rotation, yieldable torque transmitting means interposed between said elements, an electric switch comprising a pair of relatively movable contacts, a stationary support for said elements, said contacts being mounted on said support by means providing for relative movement therebetween in the direction of said axis, but preventing movement thereof about said axis, one of said elements having a series of pockets arranged in a circle concentric with the axis of rotation, arcuate slots connecting said pockets, yieldable means in said pockets, said other element comprising a spider having arms extending into said slots and engageable with the ends of said yieldable means, and means responsive to relative angular movement between said elements to effect relative movement between said contacts toward and away from each other.

5. Structure as defined in claim 4, said one element having inclined ramps arranged in a circle about the axis of rotation, the other element having openings in registration with said ramps, a plate having pins extending through said openings into engagement with said ramps and operatively connected to one of said contacts.

6. Structure as defined in claim 5, a second plate resiliently connected to said support and engaged by said first plate upon movement thereby to displace said second plate in the direction of said axis, one of said contacts being mounted on said second plate.

7. Structure as defined in claim 6, a spring contact arm carried by said support, said other contact being carried by said arm, and means for flexing said arm to adjust the normal operation of said contacts.

References Cited

UNITED STATES PATENTS

| | | | |
|---|---|---|---|
| 2,490,172 | 12/1949 | Swahnberg | 192—56 |
| 2,649,300 | 8/1953 | Launder | 192—150 X |
| 2,698,364 | 12/1954 | Gaylord et al. | 200—61.39 X |
| 2,727,957 | 12/1955 | Gamble | 200—61.46 X |
| 2,802,354 | 8/1957 | Bohnhoff et al. | 64—29 |
| 3,050,598 | 8/1962 | Fennessy | 200—61.46 |
| 3,193,653 | 7/1965 | Cope. | |
| 2,689,891 | 9/1954 | Silver et al. | 200—61.46 |
| 3,129,300 | 4/1964 | Moyles | 200—61.46 |

ROBERT K. SCHAEFER, Primary Examiner

R. A. VANDERHYE, Assistant Examiner

U.S. Cl. X.R.

64—29; 192—56